(12) United States Patent
Furuichi et al.

(10) Patent No.: US 9,457,890 B2
(45) Date of Patent: Oct. 4, 2016

(54) CONTROL DEVICE OF AIRCRAFT STEERING APPARATUS

(71) Applicant: Sumitomo Precision Products Co., LTD., Hyogo (JP)

(72) Inventors: Kazushi Furuichi, Hyogo (JP); Kazunari Tada, Hyogo (JP); Yutaro Minami, Hyogo (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 92 days.

(21) Appl. No.: 14/402,605

(22) PCT Filed: Mar. 1, 2013

(86) PCT No.: PCT/JP2013/055627
§ 371 (c)(1),
(2) Date: Nov. 20, 2014

(87) PCT Pub. No.: WO2013/179710
PCT Pub. Date: Dec. 5, 2013

(65) Prior Publication Data
US 2015/0144743 A1    May 28, 2015

(30) Foreign Application Priority Data
May 30, 2012 (JP) .................. 2012-122597

(51) Int. Cl.
*B64C 19/02* (2006.01)
*B64C 13/04* (2006.01)
(Continued)

(52) U.S. Cl.
CPC .............. *B64C 13/04* (2013.01); *B64C 13/12* (2013.01); *B64C 25/50* (2013.01)

(58) Field of Classification Search
CPC ....... B64C 25/50; B64C 13/04; B64C 13/12; B64C 13/22
USPC .................................. 244/196, 235
See application file for complete search history.

(56) References Cited

U.S. PATENT DOCUMENTS 3,368,351 A * 2/1968 Wood ................. B64C 13/24
244/194
4,192,476 A * 3/1980 Byers ................. B64C 13/06
244/233

(Continued)

FOREIGN PATENT DOCUMENTS

EP    0743581 A1 * 11/1996 ............. B64C 13/22
EP    2444318 A2    10/2011

(Continued)

OTHER PUBLICATIONS

International Search Report for related International Application No. PCT/JP2013/055627; report dated Jan. 8, 2016.

*Primary Examiner* — Brian M O'Hara
*Assistant Examiner* — Assres H Woldemaryam
(74) *Attorney, Agent, or Firm* — Miller, Matthias & Hull LLP (57) ABSTRACT

A control device 20 for an aircraft steering apparatus controls an aircraft steering apparatus 1 comprising an operation unit including rudder pedals 4, a main pilot steering handle 2 and a co-pilot steering handle 3 which are provided in a cockpit of an aircraft, and an actuator 6 driven in accordance with an operation amount output from the operation unit for driving and steering at least a steered wheel 5, and the control device 20 includes a switching control unit 22 exclusively switches, based on instruction input from at least one of a main pilot and a co-pilot, which of operation amounts corresponding to operation of the rudder pedals 4, the main pilot steering handle 2 and the co-pilot steering handle 3 is used for driving the actuator 6.

5 Claims, 6 Drawing Sheets

(51) Int. Cl.
*B64C 25/50* (2006.01)
*B64C 13/12* (2006.01)

(56) References Cited

U.S. PATENT DOCUMENTS

| | | | | |
|---|---|---|---|---|
| 5,527,004 | A * | 6/1996 | Haggerty | B64C 13/12 244/229 |
| 5,806,806 | A * | 9/1998 | Boehringer | G05D 1/0077 244/196 |
| 6,129,306 | A * | 10/2000 | Pham | B64C 37/00 244/2 |
| 6,675,076 | B1 * | 1/2004 | Moody | G05D 1/0061 244/221 |
| 6,732,979 | B1 | 5/2004 | Kilner et al. | |
| 2004/0059497 | A1 | 3/2004 | Sankrithi | |
| 2010/0276988 | A1 * | 11/2010 | Cahill | B60T 8/1703 303/20 |
| 2010/0305780 | A1 * | 12/2010 | Sataka | B64C 13/12 701/3 |
| 2011/0046819 | A1 | 2/2011 | Bailbe et al. | |
| 2012/0025029 | A1 * | 2/2012 | Szulyk | B64C 13/12 244/223 |
| 2012/0101664 | A1 | 4/2012 | Tada et al. | |
| 2014/0027567 | A1 | 1/2014 | Onomichi et al. | |

FOREIGN PATENT DOCUMENTS

| | | | | |
|---|---|---|---|---|
| JP | 2009078781 | * | 9/2007 | B64C 25/50 |
| JP | 2008-168656 | | 7/2008 | |
| JP | 2009-078781 | | 4/2009 | |
| JP | 2009078781 A | | 4/2009 | |
| JP | 2011-031800 | | 2/2011 | |
| JP | 2011-051503 | | 3/2011 | |
| JP | 2013-199201 | | 3/2013 | |

* cited by examiner

CONTROL DEVICE OF AIRCRAFT STEERING APPARATUS

CROSS-REFERENCE TO RELATED APPLICATIONS

This application is a U.S. National Stage filing under 35 USC §371 of International Patent Application No. PCT/JP2013/055627 filed on Mar. 1, 2013. This application also claims priority under the Paris Convention to Japanese Application No. 2012-122597, filed on May 30, 2012.

FIELD OF THE DISCLOSURE

The present invention relates to a control device controlling an aircraft steering apparatus, and more specifically, to a control device controlling an aircraft steering apparatus by driving an actuator in accordance with operation by a pilot.

BACKGROUND OF THE DISCLOSURE

An aircraft steering apparatus is for operating a traveling direction of an aircraft when the aircraft travels on the ground such as a runway, and generally comprises an operation unit provided in a cockpit and an actuator driving the direction of a steered wheel (rolling direction) and the direction of a rudder of a vertical tail. The aircraft steering apparatus is provided with a control device controlling a steering operation and the control device is configured to control driving of the actuator in accordance with an operation amount signal output by the operation unit.

Currently, particularly in commercial aircrafts, an aircraft is generally operated by a pair of a main pilot and a co-pilot. In response to this circumstance, an aircraft steering apparatus is configured to have, as the operation unit in the cockpit, a steering handle for the mail pilot (main pilot steering handle), rudder pedals, and a steering handle for the co-pilot (co-pilot steering handle), as shown in FIG. 3 of Japanese Unexamined Patent Application Publication No. 2009-78781.

In such an aircraft steering apparatus, based on an operation amount corresponding to operation of any one of the main pilot steering handle, the rudder pedals and the co-pilot steering handle, the directions of the steered wheel and the rudder of the vertical tail are driven and controlled, thereby steering the traveling of the aircraft. It is noted that the steered wheel is a nose landing gear wheel of the aircraft in many cases; however, in a large aircraft, the steered wheel is a main landing gear wheel as well as a nose landing gear wheel in some cases.

The rudder pedals comprise a pair of a left operation pedal and a right operation pedal and mainly operate motion of the rudder of the vertical tail. For example, the rudder pedals are operated so that, when stepping down the left (right) rudder pedal, the rudder of the vertical tail is moved in the left (right) direction and a lift to the right (left) is generated, and thereby the nose is oriented to the left (right). In terms of operation safety, the rudder pedals are designed so that, even when the amount of stepping of the rudder pedals is maximum, the angle of the nose is not changed beyond a predetermined amount so as not to result in over control. Generally, in many cases, the main pilot mainly uses the rudder pedals for steering and uses the steering handle for steering when turning the nose largely.

Conventionally, the steering system of Patent Literature 2 has been suggested as a technique of steering traveling of an aircraft in accordance with a plurality of operation amounts output by an operation unit. In the steering system of Japanese Unexamined Patent Application Publication No. 2008-168656, a control unit 4 is configured to calculate a target angle of wheel based on output of a rudder pedal sensor 1 detecting an operation angle of rudder pedals and calculate a target angle of wheel based on output of a steering handle sensor 2 detecting an operation amount of a steering handle, and sum together the target angles to obtain a steering instruction angle (target steering angle).

According to the steering system of Japanese Unexamined Patent Application Publication No. 2008-168656, it is possible to perform a fine small-angle steering using the rudder pedals and a quick large-angle steering using the steering handle in parallel; therefore, a flexible steering suited to the occasion can be achieved.

SUMMARY OF THE DISCLOSURE

In the case where a main pilot and a co-pilot simultaneously perform steering, generally, a method of configuring the apparatus so that a steering instruction by the main pilot is employed in preference to a steering instruction by the co-pilot is conceivable. However, when such a method is employed, in the case where the main pilot cannot perform a precise steering for any reason, such as his poor physical condition, and in the case where something is wrong with the operation unit for the main pilot, it is difficult to quickly realize support steering by the co-pilot.

Accordingly, a technique of complementarily combining a steering instruction by the main pilot and a steering instruction by the co-pilot has been sought for. As a likely tentative plan, it is conceivable to employ a target angle summing method like Patent Literature 2 so that target angles calculated based on operation amounts output by the main pilot steering handle, the rudder pedals, and the co-pilot steering handle are summed together, thereby determining a final steering instruction angle (target steering angle).

When such a target angle summing method is employed, it is possible to perform steering in accordance with a steering instruction by one of the pilots because steering is performed by only one of the pilots in principle; therefore, in the case where something is wrong with one of the pilots or the operation unit for him, the other pilot can cover the wrong by performing steering to cancel a steering instruction by the one pilot.

However, when such a target angle summing method is employed, in the case where something is wrong with steering by one of the pilots who is in charge of large-angle steering or the operation unit for him, even if the other pilot performs steering to cancel the steering instruction by the one pilot, the steering instruction angle obtained by summation has a small value. In this case, in the case of emergency escape of an obstacle in front of them, if, for avoiding the obstacle, the main pilot largely turns his steering handle, for example, to the left and, on the other hand, the co-pilot largely turns his steering handle to the right, there occurs a problem that their steering instructions interfere with each other and are mutually cancelled and it is therefore not possible to realize an appropriate escape operation.

Further, because operation of the rudder pedals is always reflected in steering of the steered wheel, the steered wheel is steered by operation of the rudder pedals even when the operation state of the rudder of the vertical tail is checked (so-called rudder check) in a state where the aircraft remains stationary on the ground or in the like state, which causes a problem that an unfavorable load is produced due to a friction with the ground surface.

The present invention has been achieved in view of the above-described circumstances and an object thereof is to provide a control device of an aircraft steering apparatus, which is capable of achieving a steering suited to the occasion while avoiding interference between a steering instruction by a main pilot and a steering instruction by a co-pilot.

A control device of aircraft steering apparatus of the present invention relates to a control device controlling an aircraft steering apparatus including: an operation unit having rudder pedals, a main pilot steering handle, and a co-pilot steering handle which are provided in a cockpit of an aircraft; and an actuator driven in accordance with an operation amount output from the operation unit for steering at least a steered wheel.

In the above configuration, the operation unit of the aircraft steering apparatus has the rudder pedals, the main pilot steering handle and the co-pilot steering handle, and a main pilot operates the rudder pedals and the main pilot steering handle and, on the other hand, a co-pilot operates the co-pilot steering handle. The rudder pedals, the main pilot steering handle and the co-pilot steering handle provide output corresponding to the amount of operation by an operator, such as the amount of pedal stepping and the amount of steering handle rotation. The mode of the output may be a signal transmission mode in which an electrical operation amount signal is output as a digital numerical value or the like, or may be a mechanical structural mode using a hydraulic circuit or the like.

Further, in the above configuration, the actuator is driven in accordance with an operation amount output from the operation unit for steering at least a steered wheel.

The control device of aircraft steering apparatus of the present invention includes a switching control unit exclusively switching, based on instruction input from at least one of the main pilot and the co-pilot, which of operation amounts corresponding to operation of the rudder pedals, the main pilot steering handle, and the co-pilot steering handle is used for driving the actuator.

In the above configuration, the switching control unit is configured to, under integrated instruction by the control device, drive the actuator in accordance with a selected operation amount based on instruction input from at least one of the main pilot and the co-pilot. Therefore, it is possible to achieve steering instruction suited to the occasion corresponding to the contents of the instruction input.

In the above configuration, it is preferred that a preference instruction switch is provided in the vicinity of each of the main pilot steering handle and the co-pilot steering handle for giving an instruction to preferentially select an operation amount corresponding to operation of the steering handle assigned thereto over operation amounts corresponding to operation of the other parts of the operation unit for driving the actuator.

According to this configuration, by operation instruction of the preference instruction switches, the main pilot or the co-pilot can preferentially transmit an operation amount corresponding to operation of his steering handle over operation amounts corresponding to operation of the other parts of the operation unit (the steering handle for the other pilot and the rudder pedals) and give an instruction that the actuator should be driven and controlled in accordance with the preferentially transmitted operation amount. It is noted that the form of the preference instruction switches is not particularly limited and a switch having an arbitrary form can be employed, for example, a button-type switch, a lever-type switch, a snap-type switch, etc.

Further, the control device determines an ON/OFF state of each of the preference instruction switches, and, in accordance with the ON/OFF states thereof, determines which of the operation amounts corresponding to operation of the rudder pedals, the main pilot steering handle, and the co-pilot steering handle should be transmitted to drive the actuator.

It is also preferred that
the control device determines whether the actuator is currently driven in accordance with the operation amount corresponding to operation of the rudder pedals or not,
and when, as a result of the determination, the actuator is being driven in accordance with the operation amount corresponding to operation of the rudder pedals,
if the preference instruction switch assigned to the main pilot steering handle is in the ON state, the control device instructs the switching control unit to switch to driving the actuator in accordance with the operation amount corresponding to operation of the main pilot steering handle,
and, on the other hand, if the preference instruction switch assigned to the main pilot steering handle is in the OFF state and the preference instruction switch assigned to the co-pilot steering handle is in the ON state, the control device instructs the switching control unit to switch to driving the actuator in accordance with the operation amount corresponding to operation of the co-pilot steering handle.

According to this configuration, when the actuator is being driven in accordance with operation of the rudder pedals, if the preference instruction switch for the main pilot is brought into the ON state, the actuator is thereafter driven in accordance with operation of the main pilot steering handle, and if the preference instruction switch for the co-pilot is brought into the ON state with the preference instruction switch for the main pilot in the OFF state, the actuator is thereafter driven in accordance with operation of the co-pilot steering handle thereafter. Thereby, the main pilot is allowed to take the initiative in steering instruction, in preference to the co-pilot.

Further, it is also preferred that
the control device further determines whether the actuator is currently driven in accordance with the operation amount corresponding to operation of the main pilot steering handle or not,
and when, as a result of the determination, the actuator is being driven in accordance with the operation amount corresponding to operation of the main pilot steering handle,
if the preference instruction switch assigned to the main pilot steering handle is in the OFF state, the control device instructs the switching control unit to switch to driving the actuator in accordance with the operation amount corresponding to operation of the rudder pedals.

According to this configuration, when the actuator is being driven in accordance with operation of the main pilot steering handle, if the preference instruction switch for the main pilot is brought into the OFF state, the actuator is thereafter driven in accordance with operation of the rudder pedals. Thereby, it is easy for the main pilot to flexibly and properly use the steering handle or the rudder pedals depending on a steering situation.

Further, it is also preferred that
when the actuator is currently driven in accordance with the operation amount corresponding to operation of the co-pilot steering handle,
if the preference instruction switch assigned to the co-pilot steering handle is in the OFF state, the control device instructs the switching control unit to switch to driving the actuator in accordance with the operation amount corresponding to operation of the rudder pedals.

According to this configuration, when the actuator is being driven in accordance with operation of the co-pilot steering handle, if the preference instruction switch for the co-pilot is brought into the OFF state, the actuator is thereafter driven in accordance with operation of rudder pedals. Thereby, the co-pilot can transfer the initiative in steering instruction to the rudder pedals of the main pilot when he does not want steering instruction by his steering handle.

Further, it is also preferred that the control device further determines whether the actuator is currently driven in accordance with the operation amount corresponding to operation of the main pilot steering handle or not, and when, an as a result of the determination, the actuator is being driven in accordance with the operation amount corresponding to operation of the main pilot steering handle, if the preference instruction switch assigned to the co-pilot steering handle is brought into the ON state from the OFF state, the control device instructs the switching control unit to switch to driving the actuator in accordance with the operation amount corresponding to operation of the co-pilot steering handle.

According to this configuration, when the actuator is being driven in accordance with operation of the main pilot steering handle, if the preference instruction switch for the co-pilot is brought into the ON state from the OFF state, the actuator is thereafter driven in accordance with operation of the co-pilot steering handle. Thereby, even though the co-pilot has lower priority than the main pilot, the initiative in steering instruction is given to the co-pilot when he actively expresses his intention to obtain the initiative in steering instruction.

The reason for employing this determination method is that, since the main pilot and the co-pilot are usually in the same cockpit and they can speak to each other and observe each other, when the co-pilot having lower priority intentionally gives an instruction of preference for his steering instruction, there is, in many cases, a reason such as that something is wrong with steering by the main pilot, that some kind of abnormality is found, and the like (in some cases an emergency reason). Thereby, it is possible to reflect steering instruction by the main pilot or steering instruction by the co-pilot in the steering operation depending on circumstances.

Further, it is also preferred that when the actuator is being driven in accordance with the operation amount corresponding to operation of the co-pilot steering handle, if the preference instruction switch assigned to the main pilot steering handle is brought into the ON state from the OFF state, the control device instructs the switching control unit to switch to driving the actuator in accordance with the operation amount corresponding to operation of the main pilot steering handle.

According to this configuration, when the actuator is being driven in accordance with operation of the co-pilot steering handle, if the preference instruction switch for the main pilot is brought into the ON state from the OFF state, the actuator is thereafter driven in accordance with operation of the main pilot steering handle. Thereby, even when the initiative in steering instruction is temporarily given to the co-pilot, the main pilot can recover the initiative in steering instruction by expressing his intention to obtain the initiative in steering instruction.

According to the above-described configuration, even if one of the pilots loses the initiative in steering instruction because of the other pilot's mistake or misoperation, the one pilot can recover the initiative in steering instruction based on his conviction; therefore, one of the pilots can accurately obtain the initiative in steering instruction even when the other pilot is in a bad condition or some kind of emergency situation occurs.

According to the present invention, a steering operation suited to the occasion can be achieved while avoiding interference between steering instruction by a main pilot and steering instruction by a co-pilot.

DETAILED DESCRIPTION

A specific embodiment of the present invention will be described below based on the drawings.

Figure 1:
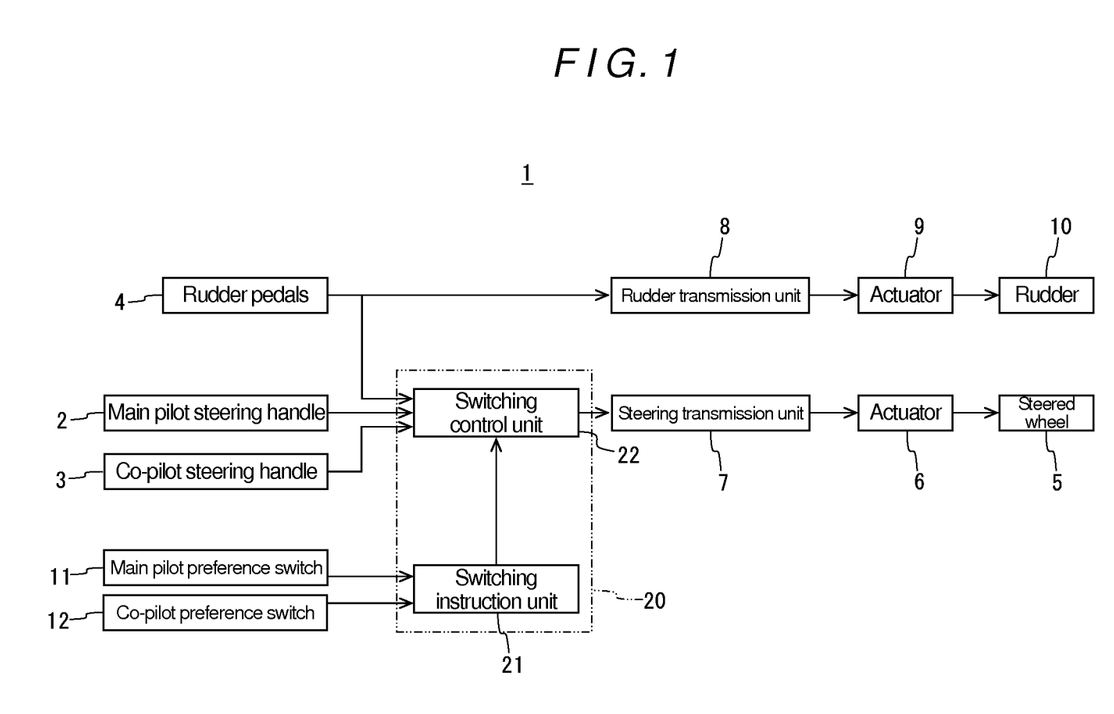
FIG. 1 is a block diagram showing a configuration of an aircraft steering apparatus including a control device according to one embodiment of the present invention.

As shown in FIG. 1, an aircraft steering apparatus 1 is provided in a cockpit of an aircraft and includes an operation unit comprising a main pilot steering handle 2, a co-pilot steering handle 3 and rudder pedals 4, and a hydraulic actuator 6 (for example, a hydraulic cylinder) driving and steering a steered wheel 5 in accordance with operation amount signals output from the operation unit.

Further, the aircraft steering apparatus 1 further includes a steering transmission unit 7 comprising a control valve for hydraulically controlling the actuator 6 driving and steering the steered wheel 5 in accordance with any one of the operation amount signals output from the main pilot steering handle 2, the co-pilot steering handle 3 and the rudder pedals 4.

The steered wheel 5 is generally a nose landing gear wheel; however, in a large aircraft, the steered wheel 5 is a main landing gear wheel as well as a nose landing gear wheel in some cases. It is noted that the operation amount signal output from the rudder pedals 4 is also transmitted to a rudder transmission unit 8 comprising a control valve for hydraulically controlling an actuator 9 and used for driving and steering a rudder 10 of a vertical tail.

Behavior of the aircraft steering apparatus 1 is controlled by a control device 20 and the control device 20 comprises a switching instruction unit 21 and a switching control unit 22.

In accordance with operation amounts of the main pilot steering handle 2, the co-pilot steering handle 3 and the rudder pedals 4, the switching control unit 22 receives operation amount signals output from them and drives the steering transmission unit 7 in accordance with any one of the operation amount signals, that is, the switching control unit 22 is configured to drive the actuator 6 through the steering transmission unit 7 in accordance with the operation amount signals.

The switching instruction unit 21 transmits a switching instruction signal to the switching control unit 22 and the switching control unit 22 is configured to switch, based on the transmitted switching instruction signal, which of the operation amount signals received from the main pilot steering handle 2, the co-pilot steering handle 3 and the rudder pedals 4 is used for driving the steering transmission unit 7 or the actuator 6.

Further, a main pilot preference switch 11 and a co-pilot preference switch 12 are provided in the vicinity of the main pilot steering handle 2 and the co-pilot steering handle 3, respectively.

The main pilot preference switch 11 and the co-pilot preference switch 12 are connected to the switching instruction unit 21 and the switching instruction unit 21 judges an ON/OFF state of each of the preference switches. The main pilot and the co-pilot each can give an instruction to employ a steering instruction from his steering handle in preference to steering instructions from the other parts of the operation unit (the other pilot's steering handle and the rudder pedals) for driving the actuator 6 by bringing the preference switch near him into the ON state.

Figure 2:
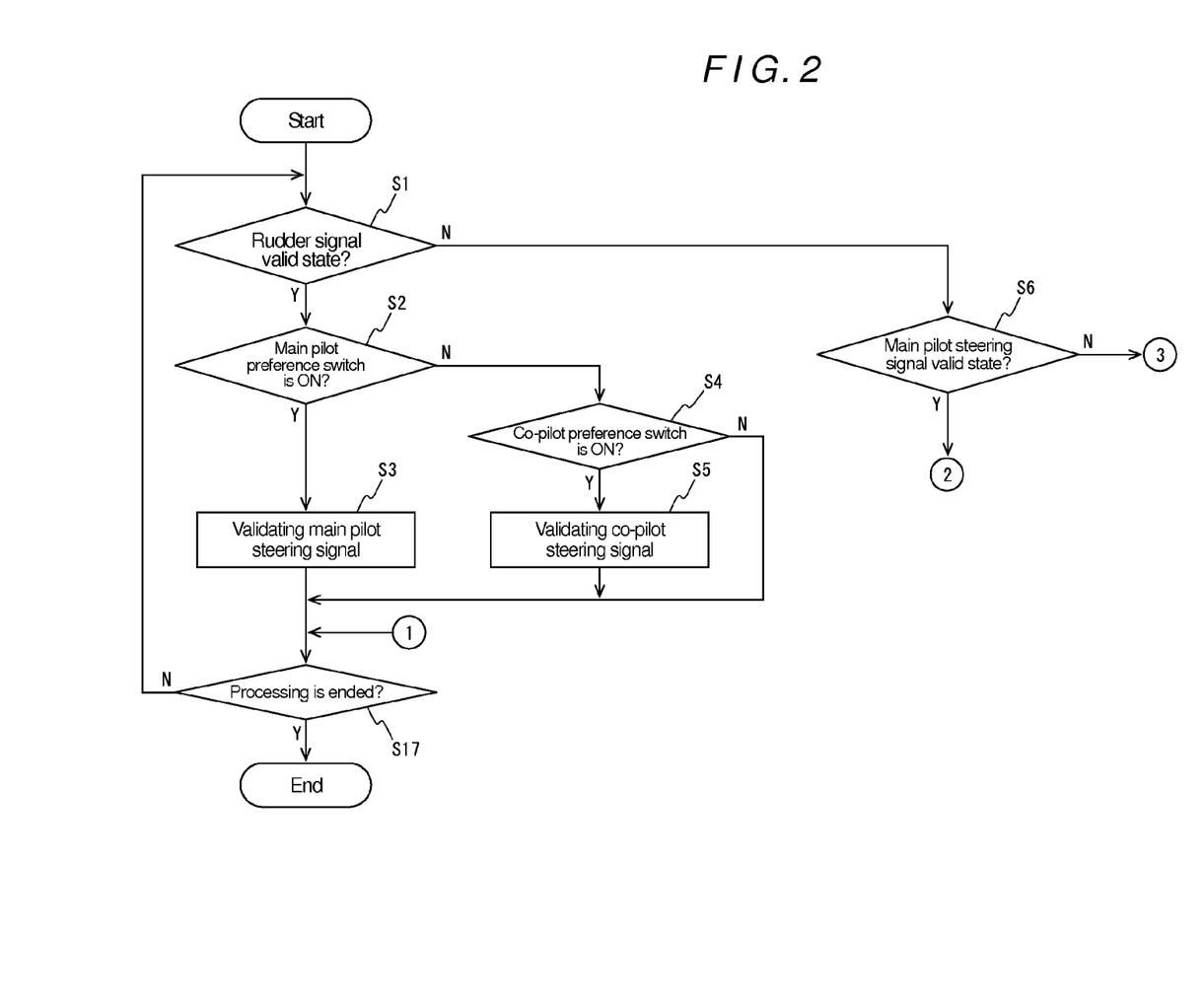
FIG. 2 is a flowchart showing processing procedures in a switching instruction unit.
Figure 3:
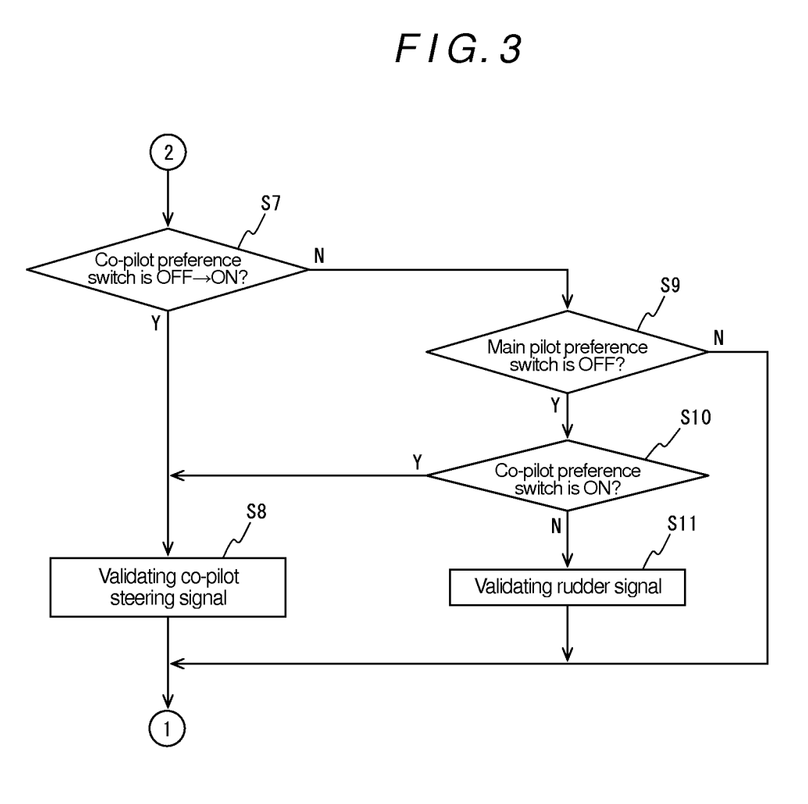
FIG. 3 is a flowchart showing the processing procedures in the switching instruction unit.
Figure 4:
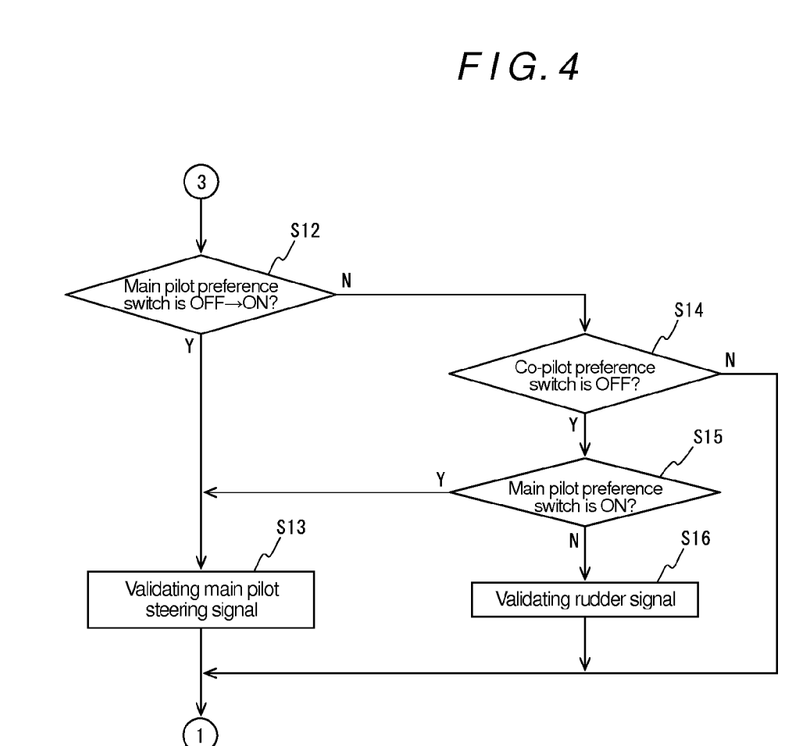
FIG. 4 is a flowchart showing the processing procedures in the switching instruction unit.

FIGS. 2 to 4 are flowcharts showing processing procedures by which the switching instruction unit 21 determines, based on the ON/OFF states of the main pilot preference switch 11 and the co-pilot preference switch 12, which of the operation amount signals received from the main pilot steering handle 2, the co-pilot steering handle 3 and the rudder pedals 4 should be used for driving the actuator 6.

Specifically, the switching instruction unit 21 is configured to sequentially execute a series of processing as shown in FIGS. 2 to 4. First, the switching instruction unit 21 determines whether the current driving of the steering transmission unit 7 is performed in accordance with the operation amount signal output from the rudder pedals 4 (rudder signal valid state) or not (Step S1), and when the current driving is performed in accordance with the operation amount signal output from the rudder pedals 4, the switching instruction unit 21 executes the processing of Step S2 and the subsequent steps.

In Step S2, the switching instruction unit 21 determines whether the main pilot preference switch 11 is in the ON state or not, and when, as a result of the determination, the main pilot preference switch 11 is in the ON state, the switching instruction unit 21 executes the processing of Step S3 and the subsequent steps for employing the operation amount signal output from the main pilot steering handle 2 in preference to the operation amount signal from the rudder pedals 4.

In Step S3, the switching instruction unit 21 transmits a switching instruction signal to the switching control unit 22 so that the steering transmission unit 7 or the actuator 6 is thereafter driven in accordance with the operation amount signal received from the main pilot steering handle 2, and then the switching instruction unit 21 proceeds to Step S17.

In Step S17, it is determined, based on an appropriate set flag, whether the determination flow of the switching instruction unit 21 is repeated or not. When the determination flow is to be repeated, the switching instruction unit 21 returns to the processing of Step 1, while when the determination flow is not to be repeated, the series of processing is ended.

In the case where, in the above-described Step S2, the main pilot preference switch 11 is not in the ON state, the switching instruction unit 21 determines whether the co-pilot preference switch 12 is in the ON state or not (Step S4). When, as a result of the determination, the co-pilot preference switch 12 is in the ON state, the switching instruction unit 21 proceeds to the processing of Step S5 for employing the operation amount signal output from the co-pilot steering handle 3 in preference to the operation amount signal output from the rudder pedals 4.

On the other hand, when, as a result of the determination in the Step S4, the co-pilot preference switch 12 is not in the ON state, the switching instruction unit 21 proceeds to Step S17.

In Step S5, the switching instruction unit 21 transmits a switching instruction signal to the switching control unit 22 so that the steering transmission unit 7 or the actuator 6 is thereafter driven in accordance with the operation amount signal received from the co-pilot steering handle 3, and then the switching instruction unit 21 proceeds to Step S17.

In the case where, in the above-described Step S1, the current driving of the steering transmission unit 7 is not performed in accordance with the operation amount signal output from the rudder pedals 4, the switching instruction unit 21 determines whether the current driving is performed in accordance with the operation amount signal received from the main pilot steering handle 2 or not (Step S6). When the current driving is performed in accordance with the operation amount signal received from the main pilot steering handle 2, the switching instruction unit 21 proceeds to the processing of Step S7 (see FIG. 3).

In Step S7, the switching instruction unit 21 determines whether the co-pilot preference switch 12 is brought into the ON state from the OFF state. When, as a result of the determination, the co-pilot preference switch 12 is brought into the ON state from the OFF state, the switching instruction unit 21 proceeds to the processing of Step S8 for preferentially employing the operation instruction of the co-pilot steering handle 3, which is assigned to the co-pilot preference switch 12 brought into the ON state from the OFF state, afterward.

In Step S8, the switching instruction unit 21 transmits a switching instruction signal to the switching control unit 22 for driving the steering transmission unit 7 or the actuator 6 in accordance with the operation amount signal received from the co-pilot steering handle 3 thereafter, and then the switching instruction unit 21 proceeds to Step S17 (see FIG. 2).

In the case where, in the above-described Step S7, the co-pilot preference switch 12 is not brought into the ON state from the OFF state, in the state where the current driving is performed in accordance with the operation amount signal received from the main pilot steering handle 2, the switching instruction unit 21 determines whether the main pilot preference switch 11 is in the OFF state or not (Step S9).

When, as a result of the determination, the main pilot preference switch 11 is in the OFF state, before switching for preferentially employing the operation amount signal output from the rudder pedals 4, the control instruction unit 21 determines whether the co-pilot preference switch 12 is in the ON state or not (Step S10). When, as a result of this determination, the co-pilot preference switch 12 is in the ON state, the switching instruction unit 21 proceeds to Step S8, while when the co-pilot preference switch 12 is not in the ON state, the switching instruction unit 21 proceeds to Step S11.

In Step S11, the switching instruction unit 21 transmits a switching instruction signal to the switching control unit 22 so that the steering transmission unit 7 or the actuator 6 is thereafter driven in accordance with the operation amount signal received from the rudder pedals 4, and then the switching instruction unit 21 proceeds to Step S17 (See FIG. 2).

In the case where, in the above-described Step S9, the main pilot preference switch 11 is not in the OFF state, the switching instruction unit 21 proceeds to Step S17 (see FIG. 2).

In the case where, in the above-described Step S6, the current driving is not performed in accordance with the operation amount signal received from the main pilot steering handle 2, this results in the fact that the steering transmission unit 7 or the actuator 9 is currently driven in accordance with the operation amount signal received from the co-pilot steering handle 3. The switching instruction unit 21 determines whether the main pilot preference switch 11 is brought into the ON state from the OFF state (Step S12). When, as a result of this determination, the main pilot preference switch 11 is brought into the ON state from the OFF state, the switching instruction unit 21 proceeds to the processing of Step S13 for preferentially using the operation instruction of the main pilot steering handle 2, which is assigned to the main pilot preference switch 11 brought into the ON state from the OFF state, afterward.

In Step S13, the switching instruction unit 21 transmits a switching instruction signal to the switching control unit 22 so that the steering transmission unit 7 or the actuator 6 is thereafter driven in accordance with the operation amount signal received from the main pilot steering handle 2, and then the switching instruction unit 21 proceeds to Step S17 (see FIG. 2).

When, as a result of the determination in Step S12, the main pilot preference switch 11 is not brought into the ON state from the OFF state, the switching instruction unit 21 proceeds to the processing of Step S14.

In Step S14, the switching instruction unit 21 determines whether the co-pilot preference switch 12 is in the OFF state. When, as a result of this determination, the co-pilot preference switch 12 is in the OFF state, the switching instruction unit 21 proceeds to the processing of Step S15 for driving the steering transmission unit 7 or the actuator 6 in accordance with an operation amount signal other than the operation amount signal received from the co-pilot steering handle 3.

In Step S15, the switching instruction unit 21 determines whether the main pilot preference switch 11 is in the ON state or not. When, as a result of this determination, the main pilot preference switch 11 is in the ON state, the switching instruction unit 21 proceeds to Step S13, while when the main pilot preference switch 11 is not in the ON state, the switching instruction unit 21 proceeds to Step S16.

In Step S16, the switching instruction unit 21 transmits a switching instruction signal to the switching control unit 22 so that the steering transmission unit 7 or the actuator 6 is thereafter driven in accordance with the operation amount signal received from the rudder pedals 4, and then the switching instruction unit 21 proceeds to Step S17 (see FIG. 2).

When, as a result of the determination in Step S14, the co-pilot preference switch 12 is not in the OFF state, the switching instruction unit 21 proceeds to Step S17 (see FIG. 2) for continuing driving the steering transmission unit 7 or the actuator 6 in accordance with the operation amount signal received from the co-pilot steering handle 3.

Thus, in the processing procedures of the switching instruction unit 21 shown in FIGS. 2 to 4, if the co-pilot preference switch 12 is brought into the ON state from the OFF state while the actuator 6 is being driven in accordance with the operation amount corresponding to operation of the main pilot steering handle 2, switching is performed so that the actuator 6 is driven in accordance with the operation amount corresponding to operation of the co-pilot steering handle 3. On the other hand, if the main pilot preference switch 11 is brought into the ON state from the OFF state while the actuator 6 is being driven in accordance with the operation amount corresponding to operation of the co-pilot steering handle 3, switching is performed so that the actuator 6 is driven in accordance with the operation amount corresponding to operation of the main pilot steering handle 2.

According to the above-described processing procedures, even if one of the pilots loses the initiative in steering instruction because of the other pilot's mistake or misoperation, the one pilot can recover the initiative in steering instruction based on his conviction; therefore one of the pilots can accurately obtain the initiative in steering instruction when the other pilot' is in a bad condition or some kind of emergency situation occurs. Thereby, it is possible to reflect steering instruction by the main pilot or steering instruction by the co-pilot in the steering operation depending on circumstances.

Further, as described earlier, the operation amount signal output from the rudder pedals 4 is used for driving and steering both the steeled wheel 5 and the rudder 10 of the vertical tail; however, according to the above-described configuration, when the operation state of the rudder of the vertical tail is checked (so-called rudder check) in the state where the aircraft remains stationary on the ground, the operation of the rudder pedals 4 can be separated from steering of the steeled wheel 5 by bringing at least one of the main pilot preference switch 11 and the co-pilot preference switch 12 into the ON state. Therefore, at the time of rudder check, the steeled wheel 5 is not driven even when the rudder pedals 4 are operated; therefore, it is possible to drive only the rudder 10 of the vertical tail to check the operation state of the rudder 10 of the vertical tail. Thereby, it can be avoided that, at the time of the rudder check, the steed wheel 5 is driven and steered and an unfavorable load is thereby produced due to a friction with the ground surface.

Figure 5:
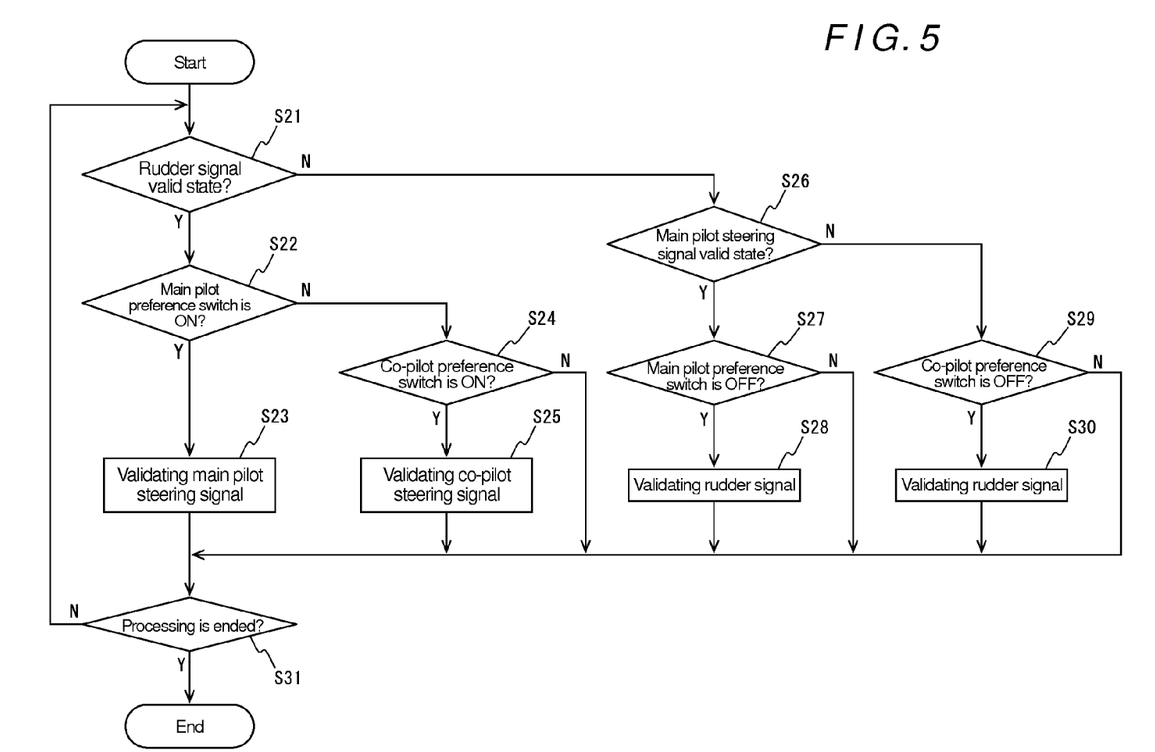
FIG. 5 is a flowchart showing processing procedures in the switching instruction unit.

FIG. 5 is a further flowchart showing processing procedures by which the switching instruction unit 21 determines, based on the ON/OFF states of the main pilot preference switch 11 and the co-pilot preference switch 12, whether which of the operation amount signals received from the main pilot steering handle 2, the co-pilot steering handle 3 and the rudder pedals 4 should be used for driving the actuator 6.

A substantial difference of the flowchart shown in FIG. 5 from the flowchart shown in FIGS. 2 to 4 is that the switching instruction unit 21, in the initial Step S21, determines whether the current driving of the steering transmission unit 7 is performed in accordance with the operation amount signal output from the rudder pedals 4 (rudder signal valid state) or not (Step S21) and a flow after, as a result thereof, it is determined that the current driving is not performed in accordance with the operation amount signal output from the rudder pedals 4 (Steps S26 to S30) is shown.

The details of the processing will be described below with focus on Steps S26 to S30. In Steps S26 to S30, it is characteristic that the operation amount signal output from the main pilot steering handle is always preferentially employed for performing the current driving when both of the main pilot preference switch 11 and the co-pilot preference switch 12 are in the ON state.

In Step S26, the switching instruction unit 21 determines whether the current driving is performed in accordance with the operation amount signal received from the main pilot steering handle 2 or not (Step S26), and when the current driving is performed in accordance with the operation amount signal received from the main pilot steering handle 2, the switching instruction unit 21 proceeds to the processing of Step S27.

In Step S27, the switching instruction unit 21 determines whether the main pilot preference switch 11 is in the OFF state or not, and when, as a result of this determination, the main pilot preference switch 11 is in the OFF state, the switching instruction unit 21 proceeds to the processing of Step S28.

In Step S28, the switching instruction unit 21 transmits a switching instruction signal to the switching control unit 22 so that the steering transmission unit 7 or the actuator 6 is thereafter driven in accordance with the operation amount signal received from the rudder pedals 4, and then the switching instruction unit 21 proceeds to Step S31.

In the case where, as a result of the determination in Step S27, the main pilot preference switch 11 is not in the OFF state, the switching instruction unit 12 proceeds to Step S31.

In the case where, as a result of the determination in Step S26, the current driving is not performed in accordance with the operation amount signal received from the main pilot steering handle 2, the switching instruction unit 21 proceeds to the processing of Step S29.

In Step S29, the switching instruction unit 21 determines whether the co-pilot preference switch 12 is in the OFF state or not. When, as a result of this determination, the co-pilot preference switch 12 is in the OFF state, the switching instruction unit 21 proceeds to the processing of Step S30.

In Step S30, the switching instruction unit 21 transmits a switching instruction signal to the switching control unit 22 so that the steering transmission unit 7 or the actuator 6 is thereafter driven in accordance with the operation amount signal received from the rudder pedals 4, and then the switching instruction unit 21 proceeds to Step S31.

When, as a result of the determination in Step S29, the co-pilot preference switch 12 is not in the OFF state, the switching instruction unit 21 proceeds to Step S31.

In Step S31, similarly to Step S17, it is determined, based on an appropriate set flag, whether the determination flow of the switching instruction unit 21 is to be repeated or not, and when it is determined that the determination flow is to be repeated, the switching instruction unit 21 returns to the processing of Step S21, while when it is determined that the determination flow is not to be repeated, the series of processing is ended.

Thus, in the processing procedures of the switching instruction unit 21 shown in FIG. 5, while the actuator 6 is being driven in accordance with the operation amount corresponding to operation of the rudder pedals 4, when the main pilot preference switch 11 is in the ON state, switching is performed so that the actuator 6 is driven in accordance with the operation amount corresponding to operation of the main pilot steering handle 2, while when the main pilot preference switch 11 is in the OFF state and the co-pilot preference switch 12 is in the ON state, switching is performed so that the actuator 6 is driven in accordance with the operation amount corresponding to operation of the co-pilot steering handle 3.

Further, in the above processing procedures, when the main pilot preference switch 11 is in the OFF state while the actuator 6 is being driven in accordance with the operation amount corresponding to operation of the main pilot steering handle 2, switching is performed so that the actuator 6 is driven in accordance with the operation amount corresponding to operation of the rudder pedals 4, and when the co-pilot preference switch 12 is in the OFF state while the actuator 6 is being driven in accordance with the operation amount corresponding to operation of the co-pilot steering handle 3, switching is performed so that the actuator 6 is driven in accordance with the operation amount corresponding to operation of the rudder pedals 4.

This makes it easy for the main pilot to properly use the steering handle and the rudder pedals depending on a steering situation; furthermore, the initiative in steering instruction is smoothly transferred between the main pilot and the co-pilot without interference.

Further, according to the above processing procedures, operation of the rudder pedals 4 can be separated from steering of the steered wheel 5 by bringing at least one of the main pilot preference switch 11 and the co-pilot preference switch 12 into the ON state and thereby, at the time of rudder check, the steered wheel 5 is not driven even when the rudder pedals 4 are operated; therefore, it is possible to drive only the rudder 10 of the vertical tail for checking the operation state of the rudder 10 of the vertical tail, which is similar to the processing procedures shown in FIGS. 2 to 4.

Thus, one embodiment of the present invention has been described; however, a specific mode in which the present invention can be implemented is not limited thereto. For example, in the above embodiment, the operation amount outputs from the main pilot steering handle 2, the co-pilot steering handle 3 and the rudder pedals 4 may be transmitted to the control device 20 through a mechanical structure, such as piping for flow of a hydraulic fluid.

Figure 6:
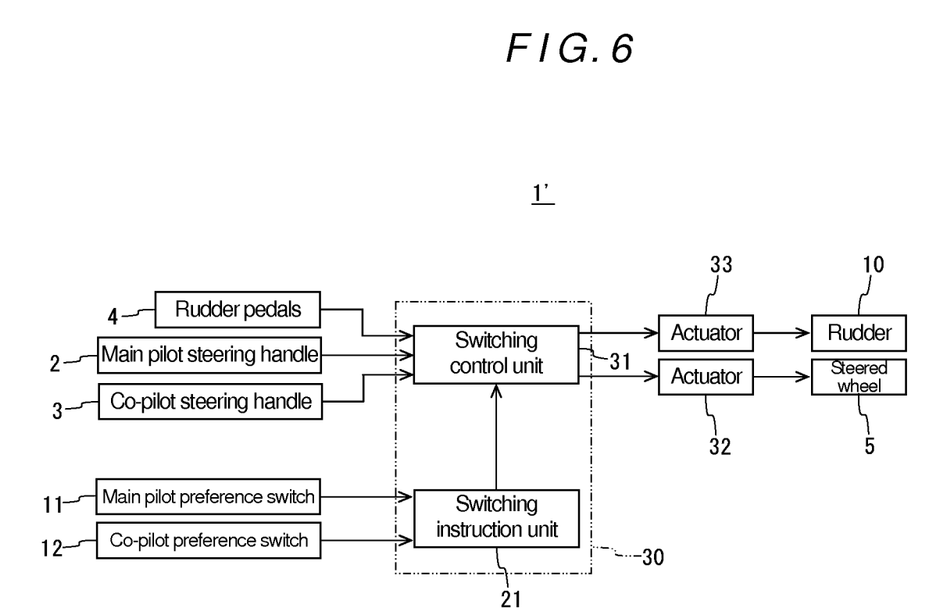
FIG. 6 is a block diagram showing a configuration of an aircraft steering apparatus including a control device according to another embodiment of the present invention.

As another embodiment of the present invention, as shown in FIG. 6, a configuration may be adopted in which behavior of an aircraft steering apparatus 1' is controlled by a control device 30 and the control device 30 comprises a switching control unit 31 and the switching instruction unit 21. It is noted that, in FIG. 6, the members denoted by the same reference numerals as those in FIG. 1 have the same configurations as those in FIG. 1.

In the aircraft steering apparatus 1', all the operation amount signals from the main pilot steering handle 2, the co-pilot steering handle 3 and the rudder pedals 4 are output to the switching control unit 31, and an appropriate operation amount signal is selected in accordance with switching instruction by the switching instruction unit 21 and actuators 32 and 33 are driven in accordance with the selected operation amount signal; thereby a steered wheel 7 and the rudder 10 can be steered.

The invention claimed is:

1. A control device for controlling an aircraft steering apparatus operating a traveling direction of an aircraft when the aircraft travels on ground, the aircraft steering apparatus comprising: an operation unit having rudder pedals, a main pilot steering handle, and a co-pilot steering handle which are provided in a cockpit of the aircraft; and an actuator driven in accordance with an operation amount output from the operation unit for driving and steering at least a steered wheel;

wherein the control device includes a switching control unit exclusively switching, based on instruction input from at least one of a main pilot and a co-pilot, which of operation amounts corresponding to operation of the rudder pedals, the main pilot steering handle, and the co-pilot steering handle is used for driving the actuator;

a preference instruction switch is provided near each of the main pilot steering handle and the co-pilot steering handle for giving an instruction to preferentially select the operation amount corresponding to operation of the steering handle assigned thereto over the operation amounts corresponding to operation of other parts of the operation unit for driving the actuator;

the control device determines whether the actuator is currently driven in accordance with the operation amount corresponding to operation of the rudder pedals;

when, as a result of the determination, the actuator is being driven in accordance with the operation amount corresponding to operation of the rudder pedals, if the preference instruction switch assigned to the main pilot steering handle is in an ON state, the control device instructs the switching control unit to switch to driving the actuator in accordance with the operation amount corresponding to operation of the main pilot steering handle; and if the preference instruction switch assigned to the main pilot steering handle is in an OFF state and the preference instruction switch assigned to the co-pilot steering handle is in an ON state, the control device instructs the switching control unit to switch to driving the actuator in accordance with the operation amount corresponding to operation of the co-pilot steering handle.

2. The control device of claim 1, in which:

the control device further determines whether the actuator is currently driven in accordance with the operation amount corresponding to operation of the main pilot steering handle; and when, as a result of this determination, the actuator is being driven in accordance with the operation amount corresponding to operation of the main pilot steering handle, if the preference instruction switch assigned to the main pilot steering handle is in an OFF state, the control device instructs the switching control unit to switch to driving the actuator in accordance with the operation amount corresponding to operation of the rudder pedals.

3. The control device of claim 2, in which:

when the actuator is currently driven in accordance with the operation amount corresponding to operation of the co-pilot steering handle, if the preference instruction switch assigned to the co-pilot steering handle is in an OFF state, the control device instructs the switching control unit to switch to driving the actuator in accordance with the operation amount corresponding to operation of the rudder pedals.

4. The control device of claim 1, in which:

the control device further determines whether the actuator is currently driven in accordance with the operation amount corresponding to operation of the main pilot steering handle; and when, an as a result of the determination, the actuator is being driven in accordance with the operation amount corresponding to operation of the main pilot steering handle, if the preference instruction switch assigned to the co-pilot steering handle is brought into an ON state from an OFF state, the control device instructs the switching control unit to switch to driving the actuator in accordance with the operation amount corresponding to operation of the co-pilot steering handle.

5. The control device of claim 4, in which;

when the actuator is being driven in accordance with the operation amount corresponding to operation of the co-pilot steering handle, if the preference instruction switch assigned to the main pilot steering handle is brought into an ON state from an OFF state, the control device instructs the switching control unit to switch to driving the actuator in accordance with the operation amount corresponding to operation of the main pilot steering handle.

* * * * *